United States Patent [19]
Koenig

[11] Patent Number: 5,607,794
[45] Date of Patent: Mar. 4, 1997

[54] PORTABLE BATTERY CASE

[76] Inventor: Neil R. Koenig, 9392 Oasis Ave., Westminster, Calif. 92683

[21] Appl. No.: 515,653

[22] Filed: Aug. 16, 1995

[51] Int. Cl.⁶ .................................................. H01M 2/10
[52] U.S. Cl. ............................ 429/100; 429/96; 429/97; 429/98
[58] Field of Search ................................ 429/96, 97, 98, 429/100

[56] References Cited

U.S. PATENT DOCUMENTS

| 2,461,002 | 2/1949 | Riggs | 429/96 |
| 3,309,235 | 3/1967 | Teeple | 429/98 |
| 3,437,164 | 4/1969 | Rabjohn | 429/96 |
| 3,741,815 | 6/1973 | Peterson | 429/100 |
| 3,791,875 | 2/1974 | Koehler | 429/97 |
| 4,756,978 | 7/1988 | Nitcher et al. | 429/96 |

Primary Examiner—Prince Willis, Jr.
Assistant Examiner—Carol Chaney

[57] ABSTRACT

A case for supplying electrical power from a battery to various objects. The inventive device includes a battery housing having a twelve volt battery contained therein. A base member is removably coupled to the housing and can be mounted relative to a boat or the like. A separable contact assembly extends between the battery housing and the base member to permit portable removal of the battery housing from the boat as desired.

5 Claims, 5 Drawing Sheets

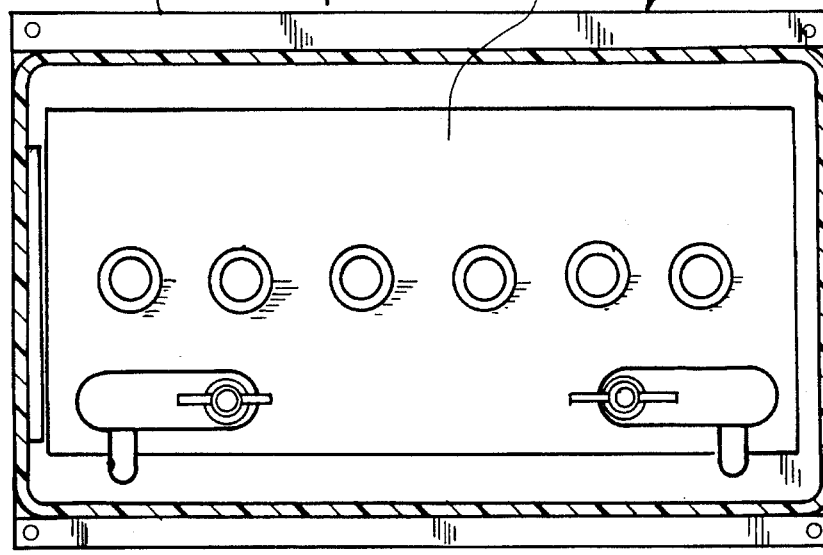
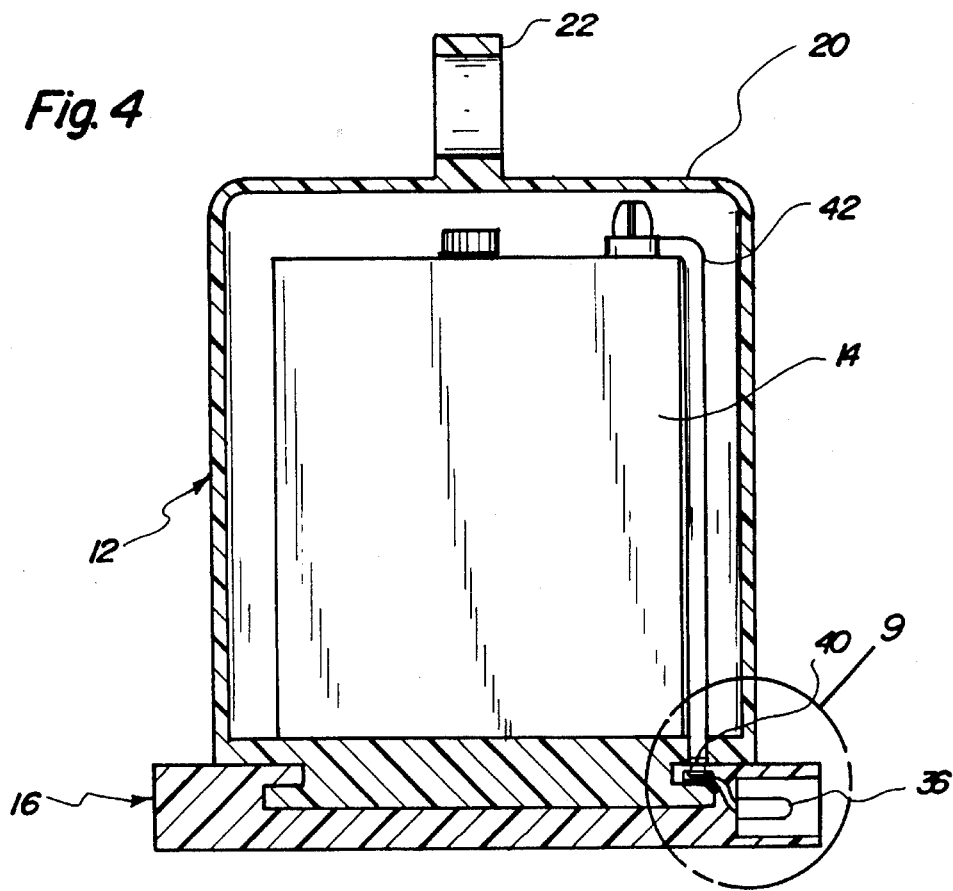

5,607,794

PORTABLE BATTERY CASE

BACKGROUND OF THE INVENTION

1. Field of the Invention

The present invention relates to electrical energy storage enclosures and more particularly pertains to a portable battery case for supplying electrical power from a battery to various objects.

2. Description of the Prior Art

The use of electrical energy storage enclosures is known in the prior art. More specifically, electrical energy storage enclosures heretofore devised and utilized are known to consist basically of familiar, expected and obvious structural configurations, notwithstanding the myriad of designs encompassed by the crowded prior art which have been developed for the fulfillment of countless objectives and requirements.

Known prior art electrical energy storage enclosures include U.S. Pat No. 4,098,218; U.S. Pat No. 4,976,637; U.S. Pat. No. 4,955,836; U.S. Pat No. 5,282,764; U.S. Pat. No. 5,234,363; and U.S. Pat. No. 5,205,766.

While these devices fulfill their respective, particular objectives and requirements, the aforementioned patents do not disclose a portable battery case for supplying electrical power from a battery to various objects which includes a battery housing having a twelve volt battery contained therein, a base member removably coupled to the housing which can be mounted relative to a boat, and a separable contact assembly extending between the battery housing and the base member to permit portable removal of the battery housing as desired.

In these respects, the portable battery case according to the present invention substantially departs from the conventional concepts and designs of the prior art, and in so doing provides an apparatus primarily developed for the purpose of supplying electrical power from a battery to various objects.

SUMMARY OF THE INVENTION

In view of the foregoing disadvantages inherent in the known types of electrical energy storage enclosures now present in the prior art, the present invention provides a new portable battery case construction wherein the same can be utilized for providing portable electric power. As such, the general purpose of the present invention, which will be described subsequently in greater detail, is to provide a new portable battery case apparatus and method which has many of the advantages of the electrical energy storage enclosures mentioned heretofore and many novel features that result in a portable battery case which is not anticipated, rendered obvious, suggested, or even implied by any of the prior an electrical energy storage enclosures, either alone or in any combination thereof.

To attain this, the present invention generally comprises a case for supplying electrical power from a battery to various objects. The inventive device includes a battery housing having a twelve volt battery contained therein. A base member is removably coupled to the housing and can be mounted relative to a boat or the like. A separable contact assembly extends between the battery housing and the base member to permit portable removal of the battery housing from the boat as desired.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable battery case apparatus and method which has many of the advantages of the electrical energy storage enclosures mentioned heretofore and many novel features that result in a portable battery case which is not anticipated, rendered obvious, suggested, or even implied by any of the prior art tool guides, either alone or in any combination there of.

It is another object of the present invention to provide a new portable battery case which may be easily and efficiently manufactured and marketed.

It is a further object of the present invention to provide a new portable battery case which is of a durable and reliable construction.

An even further object of the present invention is to provide a new portable battery case which is susceptible of a low cost of manufacture with regard to both materials and labor, and which accordingly is then susceptible of low prices of sale to the consuming public, thereby making such portable battery cases economically available to the buying public.

Still yet another object of the present invention is to provide a new portable battery case which provides in the apparatuses and methods of the prior art some of the advantages thereof, while simultaneously overcoming some of the disadvantages normally associated therewith.

Still another object of the present invention is to provide a new portable battery case for supplying electrical power from a battery to various objects.

Yet another object of the present invention is to provide a new portable battery case which includes a battery housing having a twelve volt battery contained therein, a base member removably coupled to the housing which can be mounted relative to a boat, and a separable contact assembly extending between the battery housing and the base member to permit portable removal of the battery housing as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view taken along line 3—3 of FIG. 1.

FIG. 4 is a cross-sectional view taken along line 4—4 of FIG. 3.

DESCRIPTION OF THE PREFERRED EMBODIMENT

Figure 1:
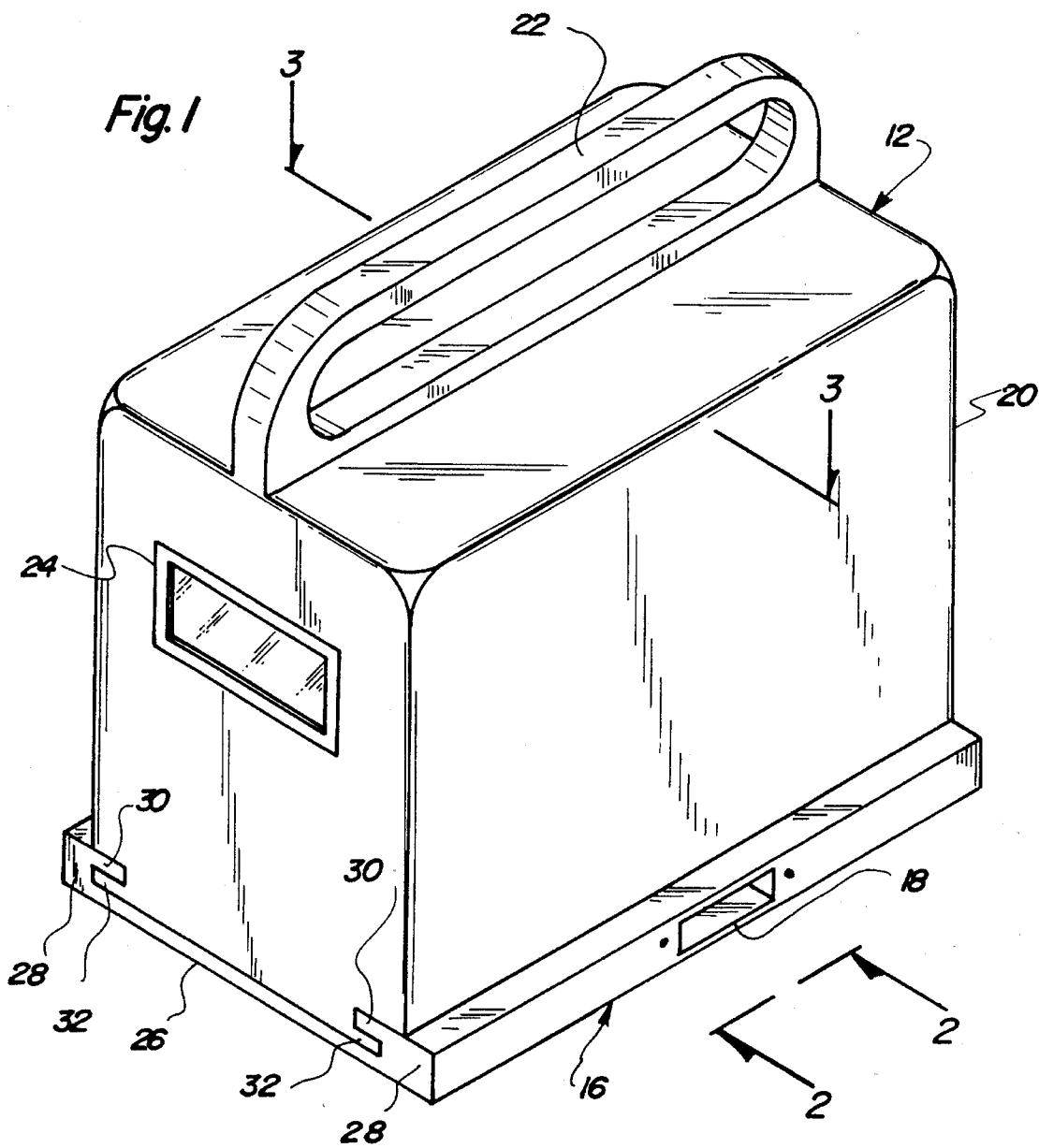
FIG. 1 is an isometric illustration of a portable battery case according to the present invention.

With reference now to the drawings, and in particular to FIGS. 1–10 thereof, a new portable battery case embodying the principles and concepts of the present invention and generally designated by the reference numeral 10 will be described.

More specifically, it will be noted that the portable battery case 10 comprises a battery housing 12 having a twelve-volt battery 14 contained therein substantially as shown in FIGS. 3 and 4 of the drawings. A base member 16 is removably coupled to a lower surface of the battery housing 12 and can be mounted within a boat or like vehicle. The base member 16 includes an electrical connection 18 positioned in electrical communication with the battery 14 which permits electrical energy to be extracted from the battery 14 for connection to in use by various objects. By this structure, the twelve-volt battery, 14 is secured within the battery housing 14 and relative to the base member 16 and can be selectively separated therefrom as desired by an end user.

Referring now to FIGS. 1 through 4 wherein the present invention 10 is illustrated in detail, it can be shown that the battery housing 12 comprises a substantially parallelpiped enclosure 20 within which the battery 14 is positioned. A handle 22 extends across an upper end of the enclosure 20 for permitting manual carrying of the battery housing 12 as desired. A display panel 24 can be directed through a side wall of the enclosure 20 and include conventionally known gauges or indicators for displaying a status of the battery 14 including voltage, current, and remaining charge.

With continuing reference to FIGS. 1 through 4, it can be shown that the base member 16 of the present invention 10 preferably comprises a substantially planar base panel 26 having spaced longitudinal lateral edges from which a pair of substantially spaced and parallel lateral projections 28 extend. The lateral projections 28 project substantially orthogonally upward from the base panel 26 and continue into retaining flanges 30 which are integrally or otherwise secured to the lateral projections. The retaining flanges 30 project from the lateral projections 28 towards one another and reside in a substantially spaced and parallel orientation relative to the base panel 26. The enclosure 20 of the battery housing 12 is accordingly shaped so as to define a pair of securing flanges 32 projecting from laterally opposed longitudinal edges thereof which can be cooperatively received between the retaining flanges 30 and the base panel 26 so as to slidably couple the battery housing 12 to the base member 16.

Figure 2:
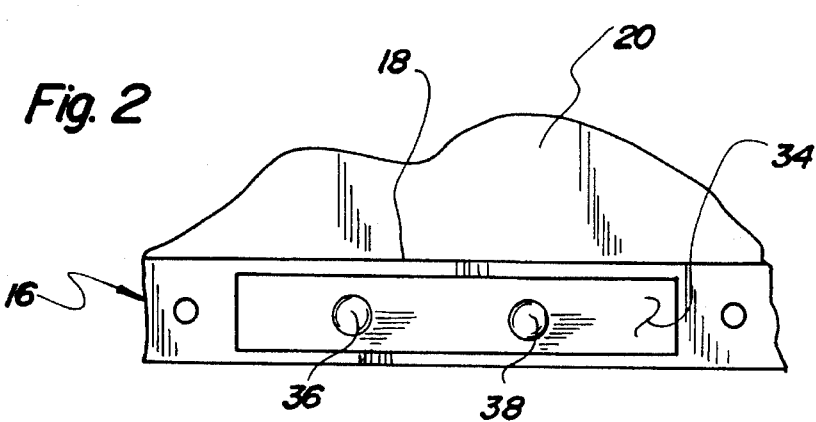
FIG. 2 is an enlarged elevation view taken from line 2—2 of FIG. 1.
Figure 9:
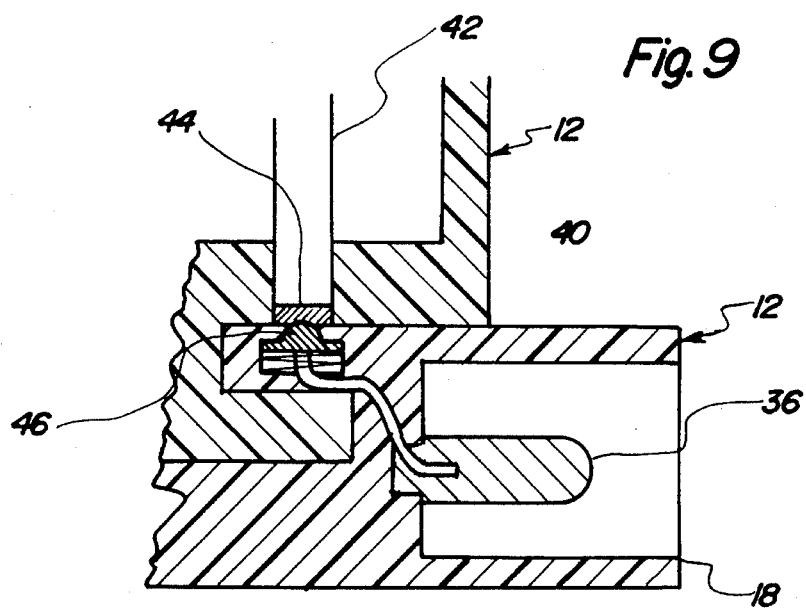
FIG. 9 is a cross-section view of the area set forth in FIG. 4.
Figure 10:
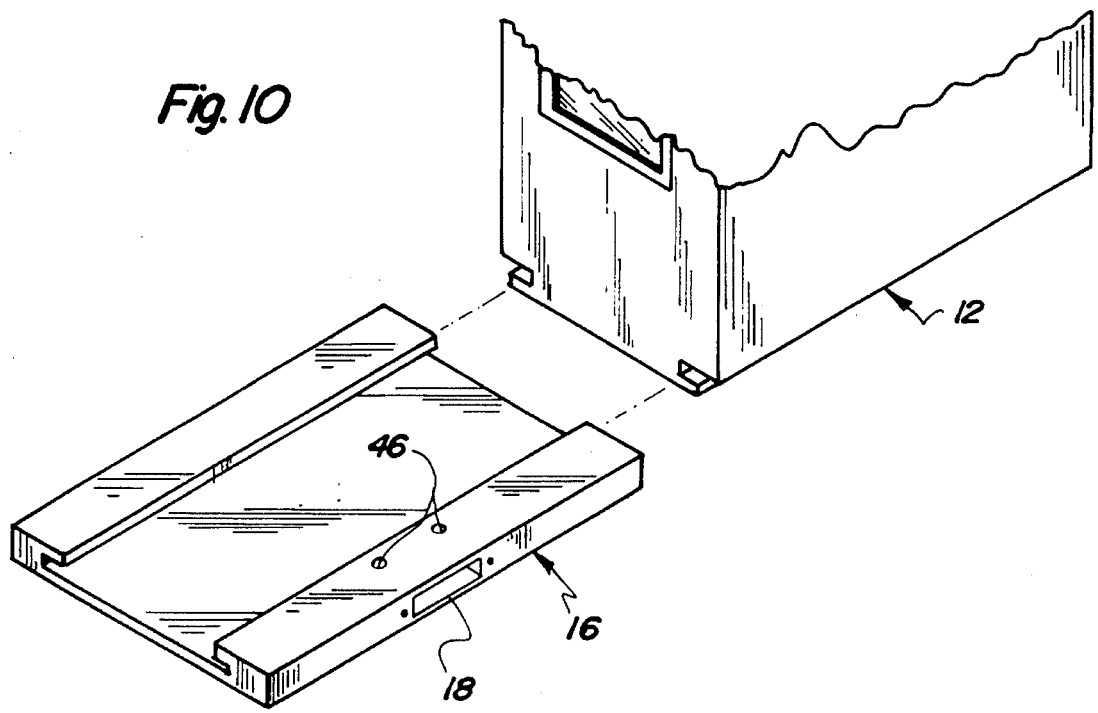
FIG. 10 is an exploded isometric illustration of the present invention.

As shown in FIG. 2, the base member 16 includes the electrical connection 18 which is positioned in electrical communication with the battery 14. To this end, the electrical connection 18 comprises a connector port 34 directed into one of the lateral projections 28 of the base member 16. A positive contact 36 and a negative contact 38 are positioned within the connector port 34 and extend into electrical communication with the battery 14. By this structure, a cooperatively configured electrical connector can be inserted into the connector port 34 and into electrical communication with the contacts 36 and 38 so as to permit extraction of electrical power from the battery 14. As shown in FIG. 4, and to permit selective decoupling of the battery housing 12 from the base member 16, a separable connector assembly 40 is interposed between the battery housing 12 and the base member 16. The separable connector assembly 40 extends into electrical communication with battery cables 42 which are coupled to unlabelled posts of the battery 14. As shown in FIG. 9, the separable connector assembly 40 thus comprises a pair of fixed contacts 44 mounted to a lower surface of the enclosure 20 of the battery housing 12 which extend into electrical communication with an individual one of the battery cables 42. A pair of spring loaded contacts 46 are mounted to the base member 12 and positioned for cooperative electrical engagement with the fixed contacts 44 of the battery housing 12. The spring loaded contacts 46 are each positioned in electrical communication with an individual one of the contacts 36 and 38 of the electrical connection 18. By this structure, the battery housing 12 can be selectively separated from the base member 16 as shown in FIG. 10 of the drawings.

Figure 5:
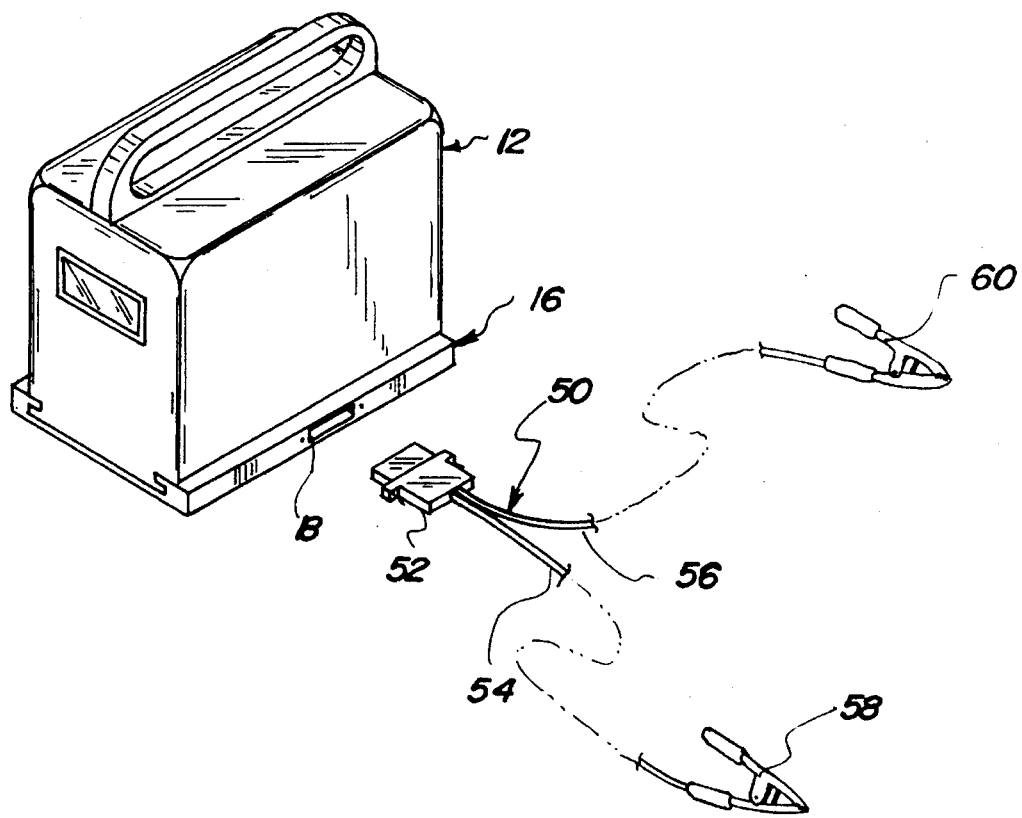
FIG. 5 is an isometric VIEW of the invention including a jumper cable.

Referring now to FIG. 5, it can be shown that the present invention 10 may further comprise a jumper cable 50 which can be selectively coupled to the electrical connection 18 of the base member 16 so as to extract electrical energy from the battery 14 within the battery housing 12. To this end, the jumper cable 50 comprises an electrical connection 52 having a positive wire 54 and a negative wire 56 extending therefrom. A positive connector clamp 58 is electrically coupled to the positive wire 54, with a negative connector clamp 60 being electrically coupled to the negative wire 56. By this structure, the connector clamps 58 and 60 can be electrically coupled to a desired object or device so as to supply electrical power thereto.

Figure 6:
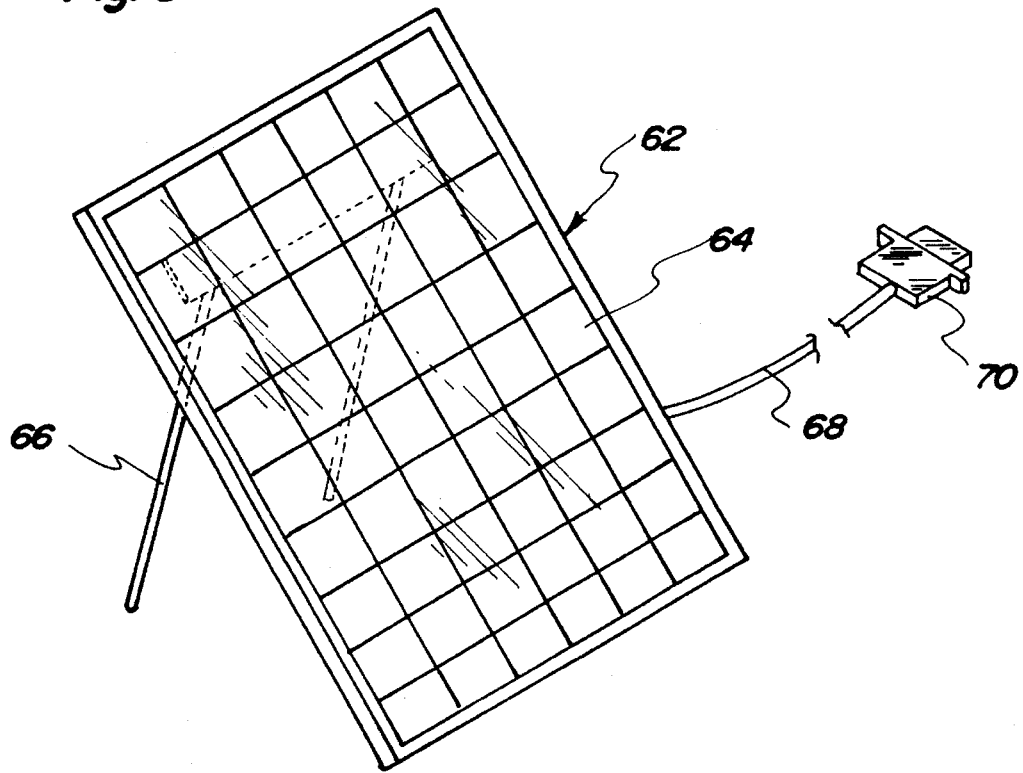
FIG. 6 is an isometric illustration of a solar charger for use with the present invention.

As shown in FIG. 6, the present invention 10 may further comprise a solar charger 62 which can be electrically coupled to the electrical connection 18 of the base member 16. To this end, the solar charger 62 comprises a solar panel array 64 having a support stand 66 extending therefrom for supporting the solar panel array 64 at an oblique inclined angle relative to a ground surface. An electrical cable 68 extends from the solar panel array 64 for supplying electrical energy therefrom to an electrical connector 70 which can be cooperatively engaged to the electrical connection 18 of the base member 16.

Figure 7:
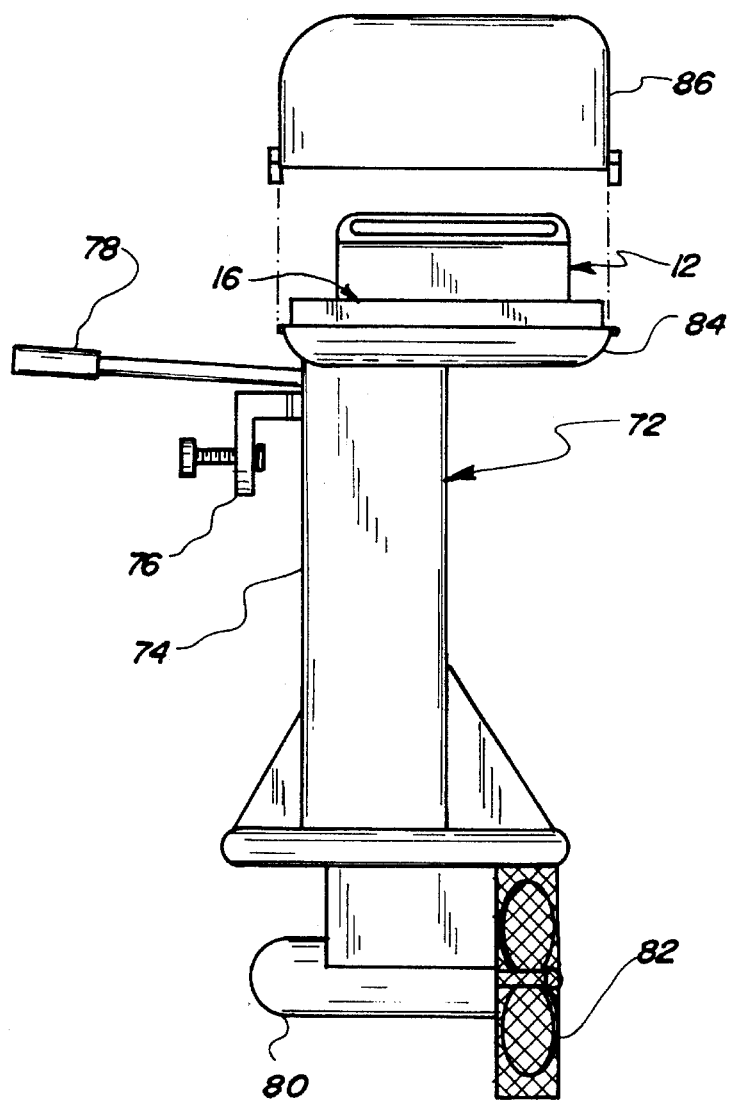
FIG. 7 is an isometric illustration of the invention including a marine outboard motor.
Figure 8:
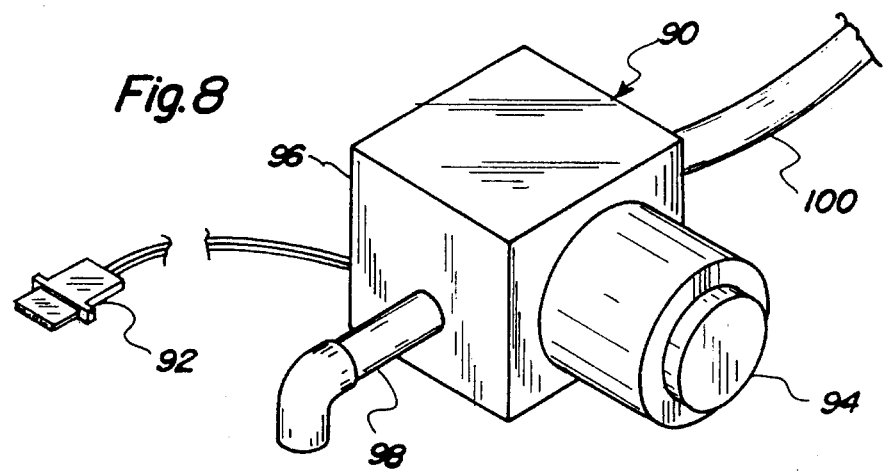
FIG. 8 is an isometric illustration of a fluid pump for use with the invention.

As shown in FIG. 7, the present invention 10 may further comprise a marine outboard motor 72 having a vertical shaft 74 which can be secured to a boat by a mounting clamp 76 and articulated relative thereto by a steering handle 78. The marine outboard motor 72 includes an electric motor 80 mounted to a lower end of the vertical shaft 74 which rotates a propeller 82 to provide marine propulsion to an associated boat. An upper housing 84 is mounted to an upper end of the vertical shaft 74 and includes a removable cover 86 which is removably coupled thereto. The base member 16 is mounted within the upper housing 84 and positioned in electrical 84. communication with the electric motor 80. The battery housing 12 is removably engaged to the base member 16 so as to be contained within the upper housing As shown in FIG. 8, the present invention 10 may be electrically coupled to a fluid pump 90 by an electrical connector 92 extending into electrical communication with the electrical connection of the base member 16. The fluid pump 90 includes an electric motor 94 coupled to a pump 96 having an intake port 98 and an output port 100. By this structure, the fluid pump 90 can be utilized as a bilge pump or the like to extract fluids from an associated boat.

In use, the portable battery case 10 of the present invention can be easily utilized for supplying electrical power from a battery to various objects. The present invention 10 allows for selective separation of the battery housing 12 from the base member 16 to permit servicing of the battery 14 such as charging or the like remote from an associated boat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A transportable battery case comprising:

a battery housing having a twelve-volt battery contained therein, the battery housing comprises a substantially parallelpiped enclosure within which the battery is positioned; and a handle extending across an upper end of the enclosure;

a base member removably coupled to a lower surface of the battery housing, the base member including an electical connection positioned in electrical communication with the battery, the base member comprises a substantially planar base panel having spaced longitudinal lateral edges from which a pair of substantially spaced and parallel lateral projections extend, the lateral projections extending substantially orthogonally upward from the base panel; retaining flanges secured to the lateral projections, the retaining flanges projecting from the lateral projections towards one another so as to reside in a substantially spaced and parallel orientation relative to the base panel, the enclosure of the battery housing being shaped so as to define a pair of securing flanges projecting from laterally opposed longitudinal edges thereof which are cooperatively received between the retaining flanges and the base panel so as to slidably couple the battery housing to the base member.

2. The portable battery case of claim 1, wherein the electrical connection comprises a connector port directed into one of the lateral projections of the base member; a positive contact and a negative contact positioned within the connector port and extending into electrical communication with the battery.

3. The portable battery case of claim 2, and further comprising a separable connector assembly interposed between the battery housing and the base member.

4. The portable battery case of claim 3, wherein the separable connector assembly comprises a pair of fixed contacts mounted to a lower surface of the enclosure of the battery housing which extend into electrical communication with the battery; and a pair of spring loaded contacts mounted to the base member and positioned for cooperative electrical engagement with the fixed contacts of the battery housing, the spring loaded contacts each positioned in electrical communication with an individual one of the contacts of the electrical connection.

5. The portable battery case of claim 4, and further comprising a jumper cable coupled to the electrical connection of the base member, the jumper cable comprising an electrical connection having a positive wire and a negative wire extending therefrom; a positive connector clamp electrically coupled to the positive wire; and a negative connector clamp electrically coupled to the negative wire.

\* \* \* \* \*